Oct. 31, 1944.     S. WEISS     2,361,439
TORQUE CONTROL SWITCH
Filed Dec. 29, 1941     3 Sheets-Sheet 1

SAMUEL WEISS
INVENTOR
BY T. J. Geisler
and F. R. Geisler
ATTORNEYS

Oct. 31, 1944.  S. WEISS  2,361,439
TORQUE CONTROL SWITCH
Filed Dec. 29, 1941  3 Sheets-Sheet 2

SAMUEL WEISS
INVENTOR
BY *T. J. Geisler*
*and F. A. Geisler*
ATTORNEYS

Oct. 31, 1944.                    S. WEISS                    2,361,439
                          TORQUE CONTROL SWITCH
                          Filed Dec. 29, 1941          3 Sheets-Sheet 3
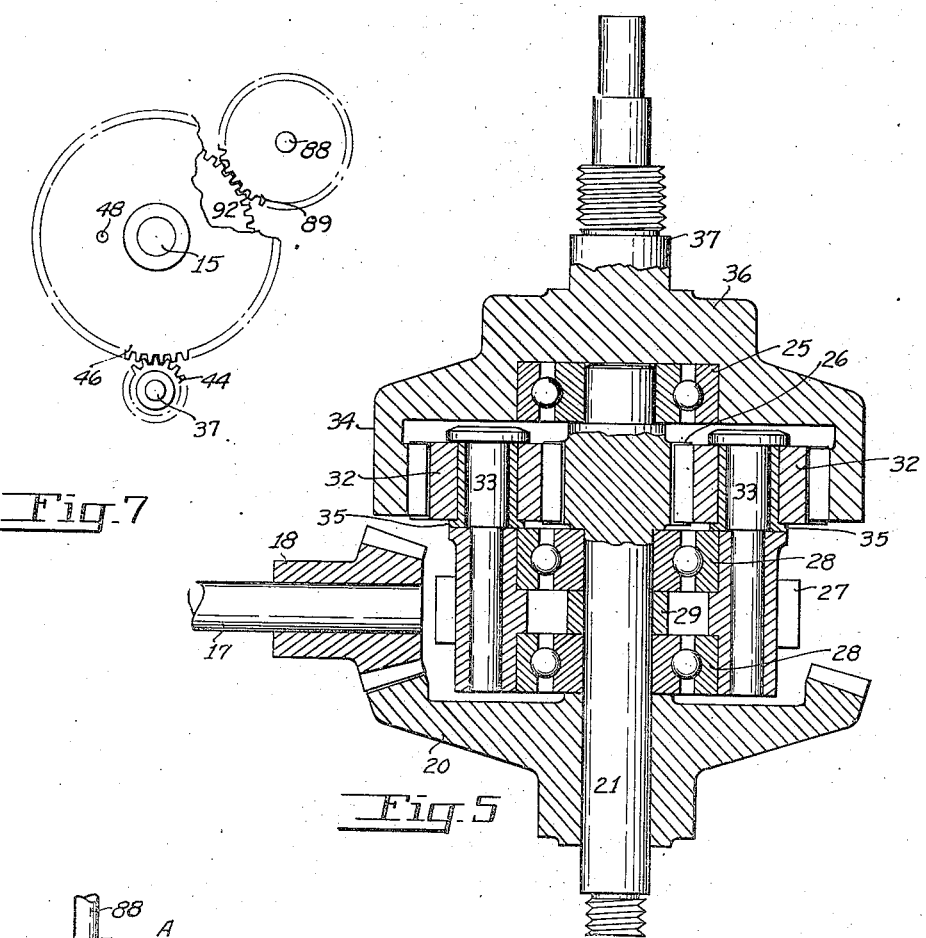
Fig. 7
Fig. 5
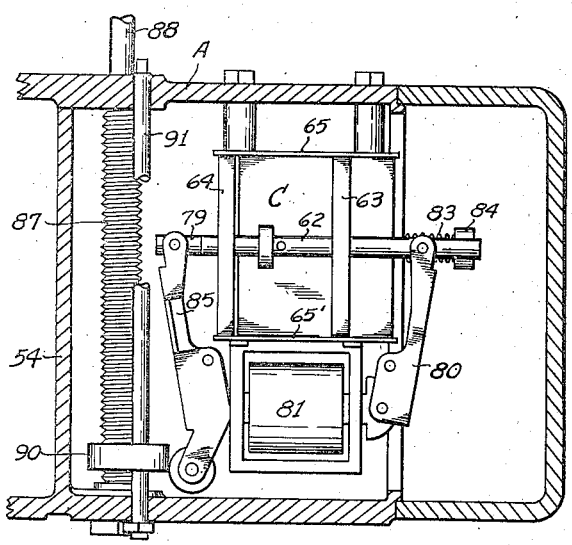
Fig. 6
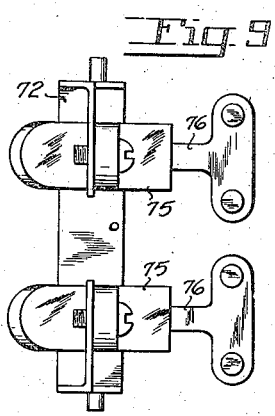
Fig. 9
SAMUEL WEISS
INVENTOR
BY T. J. Geisler
and J. R. Geisler
ATTORNEYS Patented Oct. 31, 1944

2,361,439

UNITED STATES PATENT OFFICE 2,361,439

TORQUE CONTROL SWITCH

Samuel Weiss, Portland, Oreg., assignor to Vaughan Motor Company, Inc., Portland, Oreg., a corporation of Oregon Application December 29, 1941, Serial No. 424,723

2 Claims. (Cl. 200—47)

This invention relates in general to automatic control devices for preventing the operation of power-driven means, such as motor-driven or hydraulic-driven means, beyond the point where too great a load or torque strain will result.

An important use for my invention has been found in the control required for the proper motor operation of valves, particularly valves of the gate valve type, and inasmuch as my invention will be best understood by describing a practical construction in which the invention is embodied, I shall explain the purpose and mode of operation of my invention when used in connection with a gate valve employing an operating motor and requiring control means therefor.

In such a gate valve, particularly a valve of the wedge-gate type, when the closing and opening of the valve is produced through the operation of an electric motor, sufficient force must be exerted by the motor, when closing the valve, to insure the complete and proper seating of the valve in the valve seat, and when this is properly accomplished, further operation of the motor should be immediately prevented, since such further operation would merely result in an undesirable torque strain on the operating mechanism. However, various conditions may effect the amount of power required for properly seating the valve, as well as the length of the period of operation of the motor for this purpose; and, furthermore, it will be found that when a wedge-gate valve has been firmly seated in its valve seat, a considerably greater exertion of power is required at first in order to start to reopen the valve than is required in closing or seating it.

An object of this invention, when employed in connection with the motor-operating mechanism for such a gate valve, is to provide an improved automatic electric control for the mechanism which will cause the same to function reliably and insure proper closing and opening of the gate valve, but which will protect the mechanism from any undue torque strain.

Another object of my invention is to provide an improved electric switch to be used in combination with a mechanical torque control operating device.

These and other objects of my invention will be readily understood when explained in conjunction with the gate valve control mechanism illustrated in the accompanying drawings, it being understood however that my invention may also readily be adapted for use in connection with other power-driven devices.

In the drawings:

Figure 5 is a sectional side elevation of the transmission unit shown removed from the housing and drawn to a larger scale;

Figure 6 is a sectional side elevation of the switch unit, showing the control elements in opposite position from that disclosed in Figure 3;

Figure 7 is a plan view of the gear train located above the transmission housing, for effecting opening and closing of the gate valve, showing also the connecting means for the mechanism limiting the opening of the valve;

Figure 9 is a side elevation of one of the pair of swinging brackets and associated contact elements of my improved electric switch.

Figures 1, 2:
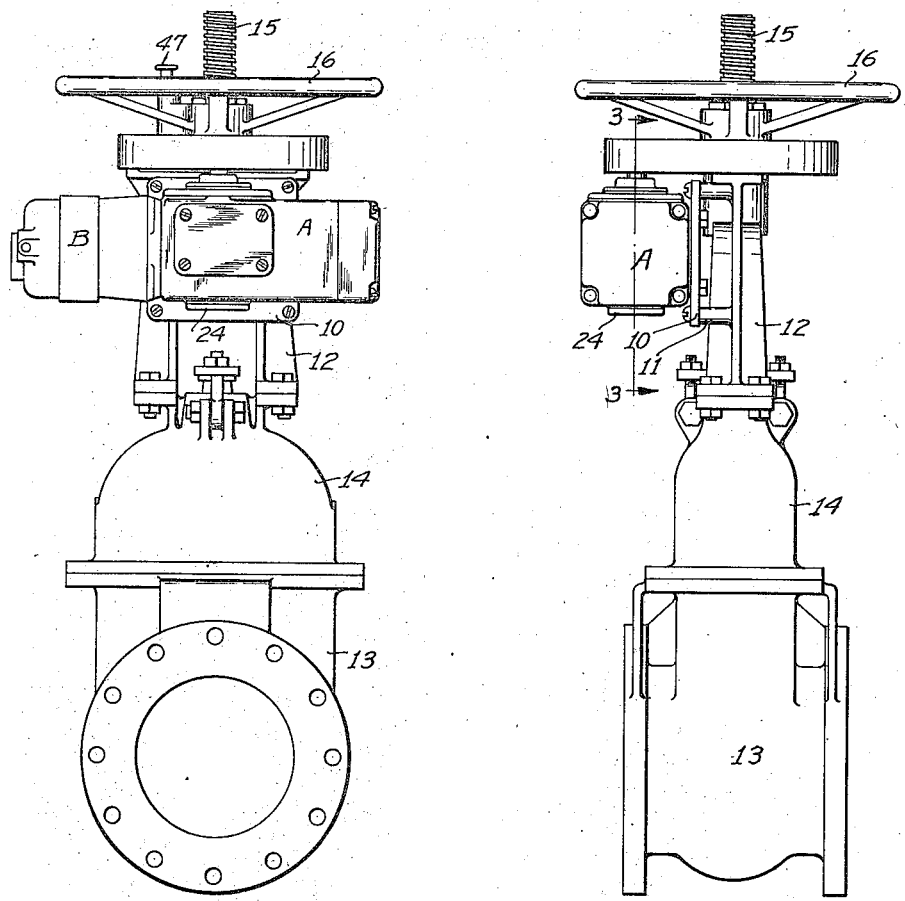
Figure 1 is a side elevation of a gate valve device embodying my invention.
Figure 2 is a corresponding end elevation of the device of Figure 1.

Referring first to Figures 1 and 2, the case or housing A, in which the torque control mechanism and switch are contained, is attached to a plate 10 mounted on suitable bosses 11 provided on the standard 12. The standard 12 is supported on the upper portion 14 or bonnet of the housing of a conventional gate valve which housing also includes the lower part or portion 13. The gate (not shown), of the gate valve, may be assumed to be of the conventional wedge-shaped type, and is connected to a threaded stem 15. A hand wheel 16, rotatably secured in bearings which prevent any axial movement of the wheel, has a threaded hub through which the stem 15 passes and which engages the stem. Rotation of the wheel 16 thus causes the stem 15 to be raised or lowered and furnishes the medium through which the gate valve may be manually opened or closed.

Where the prime mover for operating the opening and closing of the gate valve is an electric motor, such motor B (Figure 1), is secured at the end of the case or housing A. A motor-driven shaft or armature shaft 17 (Figure 3) extends longitudinally within the transmission housing A and has a bevel pinion 18 secured at its inner end. Suitable packing material 19 is placed about the hub of the bevel pinion 18 to prevent lubricant from the transmission housing A leaking into the motor B.

A bevel gear 20 (Figure 3), secured on a shaft 21, meshes with the bevel pinion 18 and causes rotation to be imparted to the shaft 21. Shaft 21, at its lower end, is mounted in an anti-friction bearing 22, and this bearing is secured in the flanged bore 23 of the transmission housing A by a bearing retainer 24. The upper end of the shaft 21 is disposed in an anti-friction bearing 25 (Figure 5) which in turn is supported within the hub 36 of a planetary gear 34. The planetary gear 34 has an integral stem or shaft 37 which extends in axial alinement with the shaft 21 (see also Figure 3).

A spur gear 26 (Figure 5) is formed integral with the shaft 21, or is mounted securely thereon. A pinion carrying member 27, of larger diameter, is rotatably mounted on shaft 21 between the spur gear 26 and the bevel gear 20. This pinion carrying member 27 is mounted for rotation on a double-set of anti-friction bearings 28 which are spaced apart by a center washer 29.

A pair of planetary pinions 32 (Figures 5 and 3) are mounted on shouldered pins 33 carried by the pinion carrying member 27. The pins 33 extend above the member 27 and have shouldered bushings 35 on which the planetary pinions 32 are mounted for rotation. The teeth of these planetary pinions 32 mesh with the teeth on the inside of the periphery of the planetary gear 34 and also with the teeth of the spur gear 26, as apparent from Figure 5.

Figure 3:
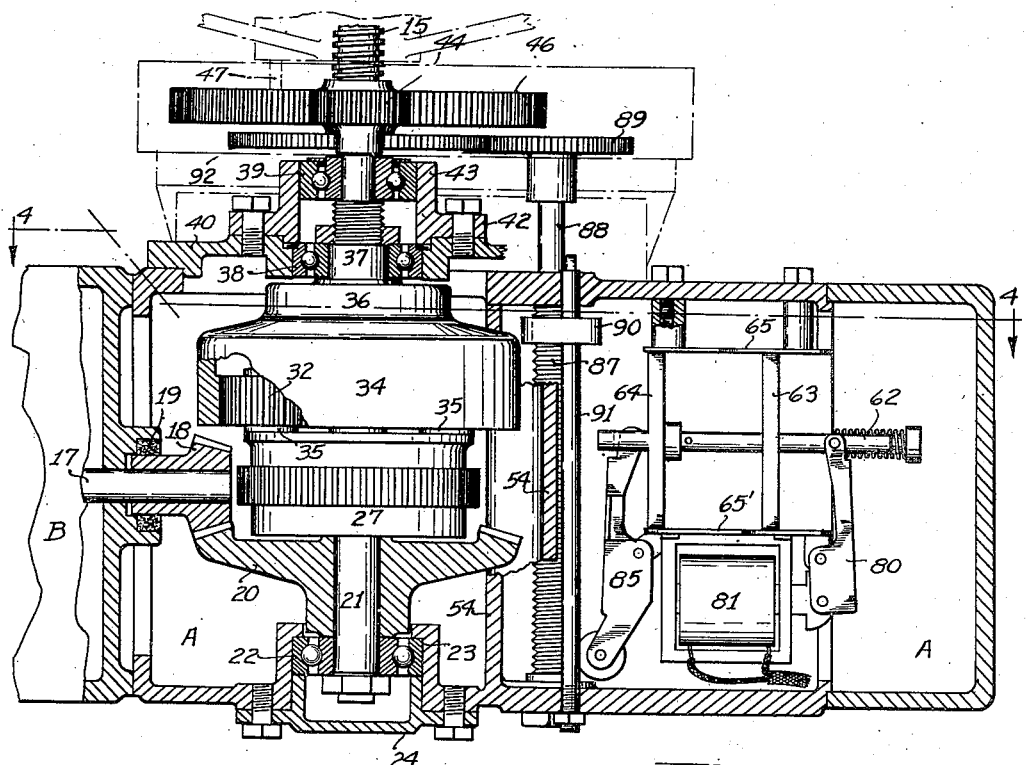
Figure 3 is a sectional side elevation of the transmission and control unit, corresponding to line 3—3 of Figure 2, but drawn to a larger scale.

The stem or shaft 37, of the planetary gear 34, is supported in a pair of bearings 38 and 39 (Figure 3). The bearing 38 is mounted in a top plate 40 of the transmission housing and bearing 39 is mounted in the hub 43 of the bearing retainer 42. Thus the shafts 37 and 21, although in axial alinement, may rotate independently of each other, depending upon the rotation of the interconnecting gears.

The member 27 (Figures 3 and 4) meshes with a rack 31, the axial movement of which operates an electric switch C in a manner to be described later. The rack 31 comprises a toothed body portion 49 and a stem 50 of smaller diameter, the end 51 of which is further reduced in diameter and is threaded. The opposite end of the body portion 49 is slidably journaled in a bearing 52 integral with the housing. The stem 50 is journaled in a hub 53, formed in the partition 54 of the housing, which partition divides the gear mechanism from the control switch. Suitable packing material 55 is disposed about the stem 50 within a recess in the hub 53 to prevent any lubricant from the gear mechanism leaking into the compartment containing the control switch. A washer 56 holds the packing material 55 within the recess.

A compression spring 57 is carried on the stem 50 and is held under tension between washer 56 at one end and washer 58 at the other end. Lock nuts 59 hold the latter washer and provide the means for adjusting the tension of the spring 57. A trip member 60 is also carried on the threaded end 51 of the stem 50 and is longitudinally adjustable thereon. The trip member 60 has a tripping arm 61 adapted to engage a slidable trip rod 62.

Figure 4:
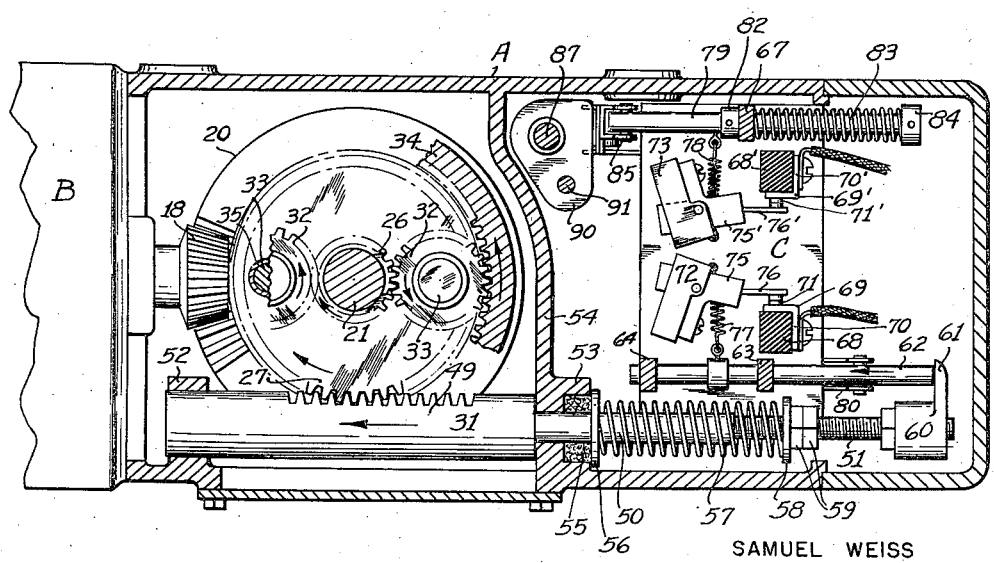
Figure 4 is a sectional plan view of the transmission and control unit, with certain parts broken away for clarity, and corresponding to the line 4—4 of Figure 3.

The control switch, which is designated in general by C in Figures 3, 4 and 6, includes a pair of top and bottom plates 65 and 65' which are spaced apart and secured together by posts 63, 64 and 67, and the top plate in turn is attached to the top of the housing A as shown in Figures 3 and 6.

The trip rod 62 is supported in, and slides through, the posts 63 and 64. A lever 80 (Figures 3 and 6), pivoted on a lug attached to the bottom plate 65', has its upper or long arm hingedly connected to the trip rod 62 and its lower or short arm hingedly connected to the movable core of a solenoid coil 81, which solenoid coil is also supported from the bottom plate 65'. Energizing of the solenoid coil 81 thus operates to move the trip rod 62 to the right, as viewed in Figures 3 and 6, Figure 3 showing the position before, and Figure 6 the position after, such movement.

A second trip rod 79, located at substantially the same level as trip rod 62, is slidably supported in the post 67 extending between the plates 65 and 65'. This second trip rod 79 is shown more clearly in Figure 4 and is provided with a pair of set collars 82 and 84 located as shown in Figure 4. A spring 83, carried on the trip rod 79, and held under tension between the post 67 and the collar 84, normally keeps the trip rod 79 in the position shown in Figure 4 with the set collar 82 urged against the post 67. A lever 85 (Figures 3 and 6), pivotally mounted on a lug attached to the bottom plate 65', has its upper end connected to the trip rod 79 and carries a cam roller at its lower end.

A pair of posts 68 and 68' (Figure 4) of insulating material also extend between the plates 65 and 65'. Two pairs of metal contact plates 69 and 69' are secured to each of the insulating posts 68 and 68', respectively. Each contact plate 69 and 69' has a terminal 70 or 70', to which a conductor wire is attached and a breaker point 71 or 71'. A swinging bracket 72 (Figure 4) is pivotally mounted between the top and bottom plates 65 and 65' and is connected by a snapover spring 77 to the trip rod 62. A second similar swinging bracket 73 is oppositely mounted between the plates 65 and 65', and is connected by a snapover spring 78 to the second trip rod 79. The two swinging brackets are identical except that they are oppositely arranged, and one of these swinging brackets is shown in Figure 9. Each bracket carries two pairs of contact elements 76 or 76', adapted to close the contacts respectively between a corresponding pair of breaker points 71 or 71' on the posts 68 or 68'. The pairs of contact elements 76 and 76' are resiliently mounted in insulating blocks 75 and 75' carried by the swinging brackets 72 and 73 respectively.

A pinion 44 (Figure 3) is secured to the top of the shaft 37. Pinion 44 meshes with a gear 46 which is journaled concentric with the threaded valve stem 15. A locking pin 47 (Figure 1), disposed through the hub of the hand wheel 16, is adapted to engage with an opening 48 (Figure 7) in gear 46. When the locking pin 47 is caused to engage the gear 46 in this manner, rotation of the gear 46 causes rotation of the hand wheel 16, and rotation of the hand wheel 16 causes axial movement of the threaded valve stem 15, and consequently movement of the gate valve, in the manner previously explained. When the locking pin 47 is disengaged from the opening 48 the hand wheel 16 may be manually rotated independently of the gear 46 and its associated mechanism, and thus the valve stem and gate valve may be operated entirely by hand whenever this should be desired under special circumstances.

A vertical shaft 88 (Figures 3 and 6) is journaled in the housing A and extends above the top of the housing. The portion 87 of the shaft which is located within the housing A, is threaded and a cam nut 90 is mounted thereon. The cam nut 90 is also slidable on a vertical guide rod 91 which serves to prevent the nut 90 from turning when the shaft 88 is rotated and thus the rotation of the shaft 88 produces up or down movement of the cam nut 90 within the housing A. A gear 89, attached to the top of the shaft 88, meshes with a pinion 92 attached to the gear 46. The purpose of the cam nut 90 is to engage the cam roller 86 and the device is so arranged that, in the opening of the valve by the power-driven mechanism, the shaft 88 will be rotated so as to move the cam nut 90 downwardly until, when the gate valve has reached its fully-opened position, the cam nut 90, by engaging the cam roller 80, will produce movement of the trip rod 79 against the tension of its spring 83, and result in the shutting off of the current to the motor in a manner which will be explained later.

In the operation of the mechanism for closing the gate valve, the electric current to the motor is turned on, causing the motor-driven shaft 17 (Figure 3) and its bevel pinion 18 to be rotated, which in turn causes rotation of gear 20, shaft 21, and integral spur gear 26. Rotation of spur gear 26 will impart rotation to the planetary pinions 32, the rotation being counter-clockwise, as viewed in Figure 4, and as indicated by the arrows, when the gate valve is being closed. Since the center pinion 27 is ordinarily restrained against rotation by the rack 31, the planetary pinions 32 temporarily are held in the same locations and their rotation produces rotation of the surrounding or planetary gear 34, and, with the rotation of planetary gear 34, are rotated shaft 37, pinion 44 (Figure 3), and gear 46. Further, assuming that gear 46 is connected to the wheel 10 by locking pin 47, the resulting rotation of gear 46 produces the desired rotation of wheel 16 and the lowering of the valve stem 15, until the gate valve is closed.

When the gate valve has been fully seated further rotation of wheel 16, gear 46, pinion 44, shaft 37, and planetary gear 34, will then be impossible. However, since the motor still continues to run and thus to produce rotation of spur gear 26 and planetary pinions 32, the latter will be forced to move on the inside of planetary gear 34 in a clockwise direction (as viewed in Figure 4), necessitating clockwise rotation of pinion carrying member 27. Such movement of the pinion carrying member 27 will now force the rack 31 to move to the left against the tension of spring 57, and this in turn will cause the tripping arm 61 to push trip rod 62 to the left (as viewed in Figure 4). This movement of the trip rod 62 to the left will swing the bracket 72, through the medium of the connecting spring 77, and break the connection between the pairs of contact points 71 and contact elements 76, causing the circuit to the motor to be disconnected, through switch means to be indicated later, and consequently stops all further operation of the motor in that direction. Thus, while the device insures the complete closing of the gate valve, and the mechanism will continue to operate until this occurs, any undue torque strain, after the seating of the valve and prior to the shutting off of the motor, is prevented. The tension of the spring 57, adjustable by the lock nuts 59, will be one of the factors determining the amount of torque load allowed before the switch is operated, and the position of the adjustable trip member 60 on the stem of the rack 31 will also affect the amount of torque load required to operate the switch and, in addition, will determine the length of the period from the time the rack first starts to be moved until the final throwing of the cut-off switch; which delayed action may be important when momentary obstructions are encountered by the gate valve during its closing.

When the gate valve is to be opened the direction of the motor is reversed, and consequently the direction of rotation of the various gears and pinions will be in the direction opposite to that previously indicated. The rack 31 will return to the position shown in Figure 4, but any further tendency of the pinion carrying member 27 to rotate counter-clockwise will be prevented, since the rack 31 cannot move further to the right, as apparent from Figure 4. Thus, regardless of the additional power which may be required to unseat the valve and start the opening of the same, the planetary pinions 32 will be held on fixed axes during the opening operation and will force the planetary gear 34 to rotate clockwise, and such clockwise rotation of the gear 34, through the various connecting means previously described, will result in the rotation of the wheel 16 and the raising of the valve stem and connected gate valve.

The cam nut 90 (Figures 3 and 4), which is moved upwardly during the closing of the gate valve, moves downwardly during the operation of the mechanism to open the valve. When the gate valve is in fully-opened position, the cam nut 90 will contact the cam roller 86, and when this occurs, the lever 85, as shown in Figure 6, will move the trip rod 79 to the left against the force of its spring 83. But, as apparent from Figure 4, movement of this trip rod 79 to the left will swing the bracket 73, to which it is connected by the snapover spring 78, which will open the contacts 71', 76', and shut off power to the motor in the manner to be later explained. The spring 83 on the trip rod 79 will return the trip rod 79 to the normal position and will keep the contacts 71', 76' closed at all times except when the cam nut 90 engages the cam roller 86.

Figure 8:
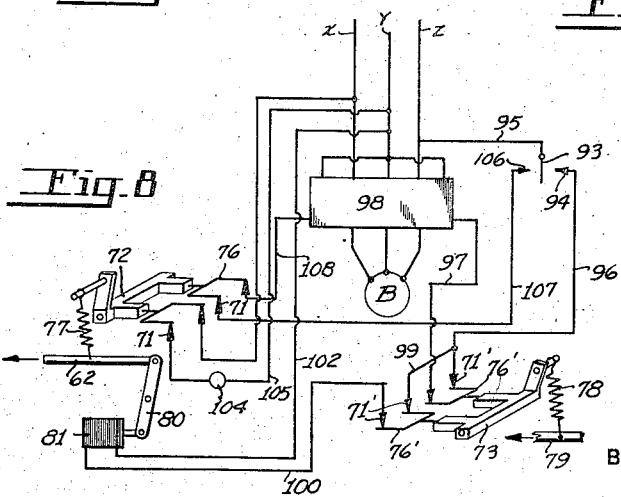
Figure 8 is a diagrammatic layout of the limit switches with their associated elements and circuits.

The electrical switch connections, and the function and operation of the circuits, constituting part of the switch C, can best be explained from the wiring diagram of Figure 8, to which reference is now made. The reversible motor B is connected to the power lines $x$, $y$, and $z$, by means of a magnetic switch 98 of conventional, well-known type, which need not be described. A manual switch 93, connected to the power line $z$ by the conductor 95, is provided for controlling the entire operation of the device, and the various elements, in general, are so arranged that closing the switch with the terminal 94 will produce operation of the motor in one direction (thus for opening the gate valve), while closing the switch contact with the other terminal 106, will produce operation of the motor in the opposite direction (to close the gate valve).

Let it be assumed that the gate valve is open, that the trip rod 62 is in its normal, or extreme right position, with the bracket 72 swung so as to close the contacts 71, 76, and that the device is now to be used to close the gate valve. The manual switch 93 is turned to close the contact to terminal 106. Current then passes over the conductor 107, through one pair of breaker points 71 which are connected by contact elements 76, thence over conductor 108, to the magnetic switch 98. This will throw the magnetic switch 98 into such a position that current will be permitted to pass to the motor B to operate the motor in the direction to close the gate valve.

For convenience, in order to indicate at all times when the gate valve is open, I provide an electric signal device or indicator, for example, a small electric light bulb 104 connected to the conductor 105. Whenever the contacts 71, 76, are closed, that is to say; whenever the trip rod 62 is in its normal position, the signal 104 will be energized, indicating that the valve is open. When the closing of the valve and the movement of the trip rod 62, as previously described, result in the opening of the contacts 71, 76, the signal means 104 will no longer be in operation.

The motor continues to operate, as mentioned, until the closing of the gate valve results in the movement of the trip rod 62 and the opening of the contacts 76, 71 and when this occurs the current of conductor 108 is shut off, which causes the magnetic switch 98 in turn to shut off the current to the motor B.

The operation of the switch wires will next be considered in the opening of the gate valve. The switch 93 is moved to close the contact to terminal 94, whereupon current passes over conductor 96, through one pair of closed contacts 76', 71', and over conductor 97 to the magnetic switch 98. This causes current to be permitted to pass to motor B to operate the motor in reverse or opening direction. Simultaneously current from conductor 96 passes over the branch 99, through the second pair of contacts 76', 71', through conductor 100, solenoid 81, and conductor 102. The energizing of the solenoid 81 pulls the trip rod 62 back to its normal position, closing its control pairs of contacts 76, 71, and the closing of one of these pairs of contacts causes the signal to be energized, as previously explained, now indicating that the gate valve is open.

When the gate valve has been opened to the full predetermined extent, the cam nut 90 (Figure 6), by engaging the cam roller 86, temporarily forces trip rod 79 to the right, which results in the opening of the related pairs of contacts 76', 71' shutting off current over conductor 97, and causing the magnetic switch 98 again to shut off current to the motor B. Although the trip rod 79 is now held in its extreme right position with the contacts 76', 71' open, the trip rod 62 remains in its normal position with its corresponding contacts 76, 71 closed; and the signal 104 consequently continues to remain energized to indicate that the gate valve is open.

I claim:

1. In a torque control for a gate valve operating mechanism of the character described, a driving shaft connected to a source of power, a spur gear secured on said driving shaft, a pinion-carrying member rotatably mounted about said driving shaft, means for holding said member against axial displacement, a plurality of planetary pinions rotatably supported on said member, said pinions meshing with said spur gear, a driven shaft connected with the valve operating mechanism, an internally-toothed planetary gear secured to one end of said driven shaft, said planetary gear extending about said pinions and the internal teeth of said planetary gear meshing with said pinions, said pinion-carrying member having external teeth on its perimeter, a rack bar slidably mounted for longitudinal movement and meshing with the external teeth on said pinion-carrying member, means restricting the longitudinal movement of said rack bar in one direction, a spring normally holding said rack bar against movement in the opposite direction, means for adjusting the tension of said spring, an engaging element adjustably mounted on said rack bar, an electric switch arranged to shut off said source of power, said switch having an actuating member positioned so as to be engaged by said engaging element and cause said switch to operate when said rack bar is moved a predetermined distance against the force of said spring, said pinion-carrying member, rack-bar and valve operating mechanism so arranged that when said mechanism is functioning to close the valve and the torque load on said mechanism exceeds a predetermined amount said rack bar will be caused to move against the force of said spring, but when said mechanism is functioning to open said valve said rack bar will be prevented from moving in the opposite direction by said means regardless of the torque load required for the opening of the valve, whereby the adjustment of said spring and the adjustment of said engaging element on said rack bar will determine the amount of excessive torque load and the period of time during which such excessive load may continue before said source of power will be automatically shut off during the closing of the valve.

2. In a torque control for a gate valve operating mechanism of the character described, a driving shaft connected to an electric motor, a spur gear secured on said driving shaft, a pinion-carrying member rotatably mounted about said driving shaft, means for holding said member against axial displacement, a plurality of planetary pinions rotatably supported on said member, said pinions meshing with said spur gear, a driven shaft connected with the valve operating mechanism, an internally-toothed planetary gear secured to one end of said driven shaft, said planetary gear extending about said pinions and the internal teeth of said planetary gear meshing with said pinions, said pinion-carrying member having external teeth on its perimeter, a rack bar slidably mounted for longitudinal movement and meshing with the external teeth on said pinion-carrying member, a shoulder on said rack bar restricting the longitudinal movement of said rack bar in one direction, a spring on said rack bar normally holding said rack bar against movement in the opposite direction, means on said rack bar for adjusting the tension of said spring, an engaging element adjustably mounted on said rack bar, an electric switch arranged to shut off said electric motor, said switch having an actuating member positioned so as to be engaged by said engaging element and cause said switch to operate when said rack bar is moved a predetermined distance against the force of said spring, said pinion-carrying member, rack-bar and valve operating mechanism so arranged that when said mechanism is functioning to close the valve and the torque load on said mechanism exceeds a predetermined amount said rack bar will be caused to move against the force of said spring, but when said mechanism is functioning to open said valve said rack bar will be prevented from moving in the opposite direction by said shoulder on said rack bar regardless of the torque load required for the opening of the valve, whereby the adjustment of said spring and the adjustment of said engaging element on said rack bar will determine the amount of excessive torque load and the period of time during which such excessive load may continue before said electric motor will be automatically shut off during the closing of the valve.

SAMUEL WEISS.